(12) United States Patent
Tomita et al.

(10) Patent No.: US 11,149,818 B2
(45) Date of Patent: Oct. 19, 2021

(54) ROTARY DEVICE

(71) Applicant: EXEDY Corporation, Neyagawa (JP)

(72) Inventors: Yusuke Tomita, Neyagawa (JP); Keisuke Sakai, Neyagawa (JP)

(73) Assignee: EXEDY CORPORATION, Neyagawa (JP)

( * ) Notice: Subject to any disclaimer, the term of this patent is extended or adjusted under 35 U.S.C. 154(b) by 122 days.

(21) Appl. No.: 16/727,174

(22) Filed: Dec. 26, 2019

(65) Prior Publication Data

US 2020/0271189 A1    Aug. 27, 2020

(30) Foreign Application Priority Data

Feb. 25, 2019 (JP) .............................. JP2019-031912

(51) Int. Cl.
 *F16F 15/14* (2006.01)
(52) U.S. Cl.
 CPC ............ *F16F 15/145* (2013.01); *F16F 15/14* (2013.01); *F16F 2230/0064* (2013.01)
(58) Field of Classification Search
 CPC .... F16F 15/12; F16F 15/1217; F16F 15/1297; F16F 15/131; F16F 15/134; F16F 15/14; F16F 15/1407; F16F 15/145; F16F 15/1457; F16F 2230/0064
 See application file for complete search history.

(56) References Cited

U.S. PATENT DOCUMENTS

| | | | |
|---|---|---|---|
| 9,732,835 B2 * | 8/2017 | Kawahara | F16F 15/12353 |
| 9,915,329 B2 * | 3/2018 | Kawahara | F16H 45/02 |
| 10,495,178 B2 * | 12/2019 | Tomita | F16F 15/1202 |
| 10,718,403 B1 * | 7/2020 | Kitada | F16F 15/1457 |
| 2012/0055281 A1 * | 3/2012 | Huegel | F16F 15/145 74/574.2 |
| 2016/0208876 A1 * | 7/2016 | Movlazada | F16F 1/10 |

(Continued)

FOREIGN PATENT DOCUMENTS

| | | | | |
|---|---|---|---|---|
| DE | 102017109894 A1 * | 11/2018 | | F16F 15/145 |
| DE | 102017113054 A1 * | 12/2018 | | F16F 15/145 |
| DE | 102017123073 A1 * | 4/2019 | | F16F 15/145 |

(Continued)

*Primary Examiner* — Adam D Rogers
(74) *Attorney, Agent, or Firm* — United IP Counselors, LLC

(57) ABSTRACT

A rotary device includes two rotatable rotors and two stopper mechanisms. The first and second stopper mechanisms restrict relative rotation between the rotors. The first stopper mechanism includes a first protruding member and a first contact surface. The first protruding member includes an elastic outer peripheral part. The first contact surface is disposed at an interval from the first protruding member. The first protruding member contacts the first contact surface when a torsion angle between the rotors reaches a first angle. The second stopper mechanism includes a second protruding member and a second contact surface. The second protruding member includes an outer peripheral part having higher stiffness than that of the first protruding member. The second contact surface is disposed at an interval from the second protruding member. The second protruding member contacts the second contact surface when the torsion angle reaches a second angle greater than the first angle.

11 Claims, 10 Drawing Sheets

(56) References Cited

U.S. PATENT DOCUMENTS

2020/0271190 A1* 8/2020 Kitada .................. F16F 15/145
2021/0041006 A1* 2/2021 Saeki .................. F16F 15/1234

FOREIGN PATENT DOCUMENTS

| DE | 102018119903 A1 | * | 2/2020 | ............ F16F 15/145 |
| DE | 102019101151 A1 | * | 7/2020 | ............ F16F 15/145 |
| GB | 584849 A | * | 1/1947 | .............. F16F 15/14 |
| JP | 2017-053467 A | | 3/2017 | |

* cited by examiner

ROTARY DEVICE

CROSS-REFERENCE TO RELATED APPLICATIONS

This application claims priority to Japanese Patent Application No. 2019-031912, filed on Feb. 25, 2019. The contents of that application are incorporated by reference herein in their entirety.

TECHNICAL FIELD

The present invention relates to a rotary device.

BACKGROUND ART

In a rotary device such as a torque fluctuation inhibiting device, a first rotor and a second rotor are disposed to be rotatable relative to each other. For example, a toque fluctuation inhibiting device described in Japan Laid-open Patent Application Publication No. 2017-53467 includes a hub flange, inertia rings and cam mechanisms. The cam mechanisms apply variable torsional stiffness between the hub flange and the inertia ring. Because of this, the hub flange and the inertia ring, although unitarily rotated with each other, are displaced relative to each other when fluctuations occur in a torque inputted to the torque fluctuation inhibiting device.

Stopper mechanisms are provided for preventing the hub flange and the inertia ring from being excessively displaced relative to each other. Each stopper mechanism is composed of a stop pin and an elongated hole. When the hub flange and the inertia ring are displaced relative to each other by more than a predetermined phase, the stop pin makes contact with the inner wall surface of the elongated hole. This prevents the hub flange and the inertia ring from being excessively displaced relative to each other. Moreover, in order to prevent collision sound from being produced by the stop pin in actuation of the stopper mechanism, an outer peripheral part of the stop pin is made of elastic material such as rubber.

When excessive fluctuations occur in a torque inputted to the torque fluctuation inhibiting device, the outer peripheral part of such a protruding member as the stop pin largely deflects and has chances of being damaged or broken. It is an object of the present invention to inhibit damage or breakage of the outer peripheral part of the protruding member.

BRIEF SUMMARY

A rotary device according to a first aspect of the present invention includes a first rotor, a second rotor, a first stopper mechanism and a second stopper mechanism. The first rotor is disposed to be rotatable. The second rotor is disposed to be rotated with the first rotor and be rotatable relative to the first rotor. The first stopper mechanism restricts relative rotation between the first rotor and the second rotor. The first stopper mechanism includes a first protruding member and a first contact surface. The first protruding member includes an outer peripheral part made of an elastic material. The first contact surface is disposed at an interval from the first protruding member in a circumferential direction. The second stopper mechanism restricts the relative rotation between the first rotor and the second rotor. The second stopper mechanism includes a second protruding member and a second contact surface. The second protruding member includes an outer peripheral part made of a material having a higher stiffiiess than the outer peripheral part of the first protruding member. The second contact surface is disposed at an interval from the second protruding member in the circumferential direction. The first protruding member makes contact with the first contact surface when a torsion angle between the first rotor and the second rotor reaches a first angle. The second protruding member makes contact with the second contact surface when the torsion angle between the first rotor and the second rotor reaches a second angle greater than the first angle.

According to this configuration, when excessive fluctuations occur in a torque inputted to the rotary device, the torsion angle between the first rotor and the second rotor reaches the first angle, whereby the first protruding member makes contact with the first contact surface. Hence, the first and second rotors can be inhibited from being rotated relative to each other at more than the first angle. It should be noted that the outer peripheral part of the first protruding member is made of the elastic material. Hence, collision sound can be inhibited from being produced when the first protruding member makes contact with the first contact surface.

When further excessive fluctuations occur in the torque inputted to the rotary device, the outer peripheral part of the first protruding member makes contact with the first contact surface and is elastically deformed, whereby the first and second rotors are rotated relative to each other at more than the first angle. When the torsion angle between the first rotor and the second rotor herein exceeds the first angle and reaches the second angle, the second protruding member makes contact with the second contact surface. Because of this, the first and second rotors are inhibited from being displaced relative to each other at more than the second angle. Thus, when the torsion angle reaches the second angle, the first and second rotors are restricted from being rotated relative to each other not only by the first stopper mechanism but also by the second stopper mechanism. Hence, the maximum load, acting on the outer peripheral part of the first protruding member, is made smaller than that when the rotary device does not include the second stopper mechanism. Therefore, damage or breakage of the outer peripheral part of the first protruding member can be inhibited. It should be noted that the outer peripheral part of the second protruding member has a higher stiffiiess than that of the first protruding member. Hence, the first and second rotors can be further inhibited from being displaced relative to each other at more than the second angle.

Preferably, the outer peripheral part of the first protruding member is made of rubber.

Preferably, the outer peripheral part of the second protruding member is made of metal.

Preferably, the first and second contact surfaces are provided in the first rotor, and the first and second protruding members are fixed to the second rotor.

Preferably, the first protruding member is fixed to the first rotor, and the first contact surface is provided in the second rotor. Besides, the second protruding member is fixed to the second rotor, and the second contact surface is provided in the first rotor.

Preferably, the second protruding member is a pawl portion formed by bending in part the first or second rotor in an axial direction.

Preferably, the second stopper mechanism is disposed on an inner side of the first stopper mechanism in a radial direction.

Preferably, the second stopper mechanism is disposed on an outer side of the first stopper mechanism in a radial direction.

Preferably, the second stopper mechanism is disposed at an interval from the first stopper mechanism in the circumferential direction.

Preferably, the rotary device further includes a variable stiffness mechanism. The variable stiffness mechanism is configured to change a torsional stiffness between the first rotor and the second rotor in accordance with a rotational speed of the first or second rotor.

Preferably, the variable stiffness mechanism includes a centrifugal element and a cam mechanism. The centrifugal element is disposed to be radially movable by a centrifugal force acting thereon in rotation of the first or second rotor. The cam mechanism receives the centrifugal force acting on the centrifugal element, and converts the centrifugal force into a circumferential force directed to reduce the torsion angle between the first rotor and the second rotor.

Overall, according to the present invention, it is possible to inhibit damage or breakage of an outer peripheral part of a protruding member.

DETAILED DESCRIPTION

Figure 1:
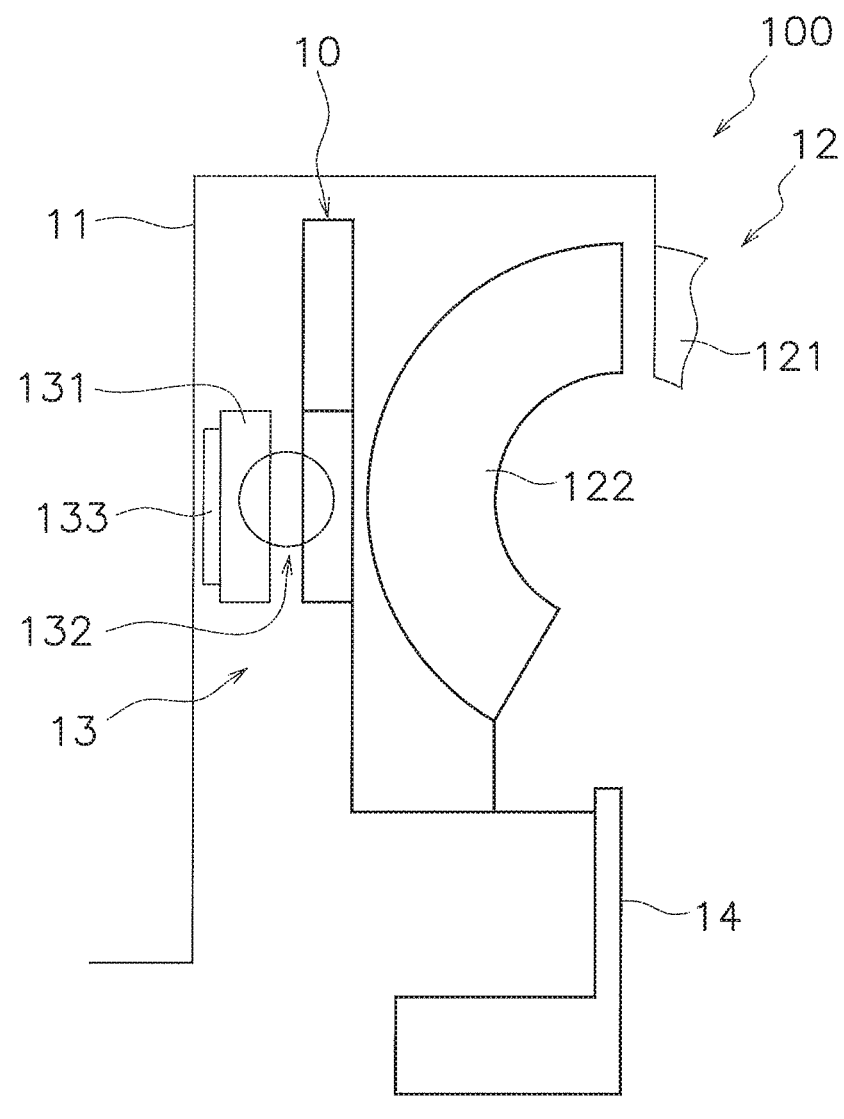
FIG. 1 is a schematic diagram of a torque converter.

A torque fluctuation inhibiting device, which is a preferred embodiment of a rotary device according to the present invention, will be hereinafter explained with reference to drawings. FIG. 1 is a schematic diagram of a condition that the torque fluctuation inhibiting device according to the present preferred embodiment is attached to a lock-up device for a torque converter. It should be noted that in the following explanation, the term "axial direction" refers to an extending direction of a rotational axis O of the torque fluctuation inhibiting device. On the other hand, the term "circumferential direction" refers to a circumferential direction of an imaginary circle about the rotational axis O, whereas the term "radial direction" refers to a radial direction of the imaginary circle about the rotational axis O.

[Entire Configuration]

As shown in FIG. 1, a torque converter 100 includes a front cover 11, a torque converter body 12, a lock-up device 13 and an output hub 14. A torque is inputted to the front cover 11 from a drive source such as an engine. The torque converter body 12 includes an impeller 121 coupled to the front cover 11, a turbine 122 and a stator (not shown in the drawings). The turbine 122 is coupled to the output hub 14. An input shaft of a transmission or so forth (not shown in the drawings) is spline-coupled to the output hub 14.

[Lock-Up Device 13]

The lock-up device 13 includes a clutch part, a piston to be actuated by hydraulic pressure, and so forth, and can be set to a lock-up on state and a lock-up off state. In the lock-up on state, the torque inputted to the front cover 11 is transmitted to the output hub 14 through the lock-up device 13 without through the torque converter body 12. On the other hand, in the lock-up off state, the torque inputted to the front cover 11 is transmitted to the output hub 14 through the torque converter body 12.

The lock-up device 13 includes an input-side rotor 131, a damper 132 and a torque fluctuation inhibiting device 10.

The input-side rotor 131 includes the piston axially movable, and is provided with a friction member 133 fixed to the front cover 11-side lateral surface thereof. When the friction member 133 is pressed onto the front cover 11, the torque is transmitted from the front cover 11 to the input-side rotor 131.

The damper 132 is disposed between the input-side rotor 131 and a hub flange 2 (to be described). The damper 132 includes a plurality of torsion springs, and elastically couples the input-side rotor 131 and the hub flange 2 in the circumferential direction. The damper 132 transmits the torque from the input-side rotor 131 to the hub flange 2, and also, absorbs and attenuates torque fluctuations.

[Torque Fluctuation Inhibiting Device 10]

Figure 2:
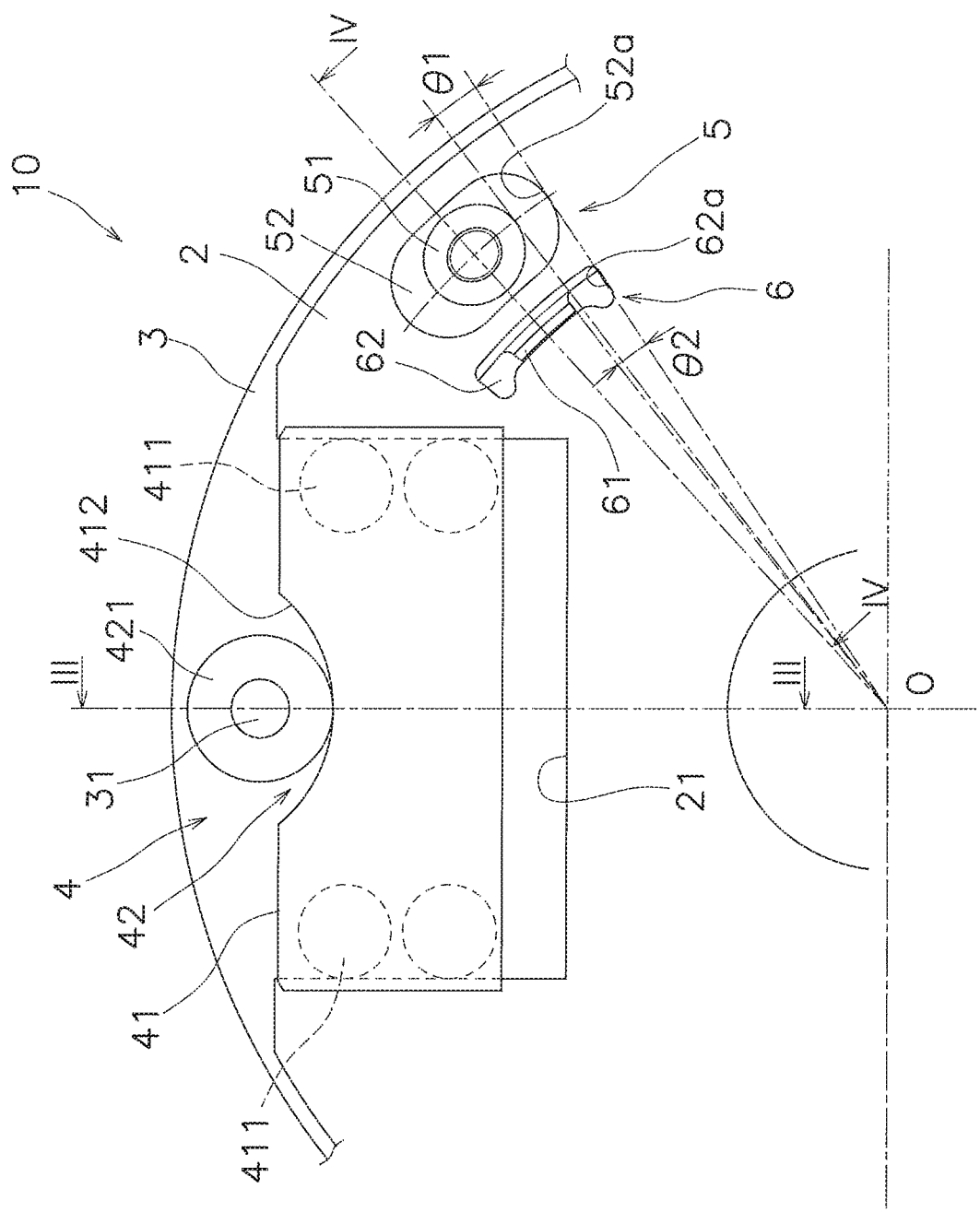
FIG. 2 is an enlarged view of a torque fluctuation inhibiting device.
Figure 3:
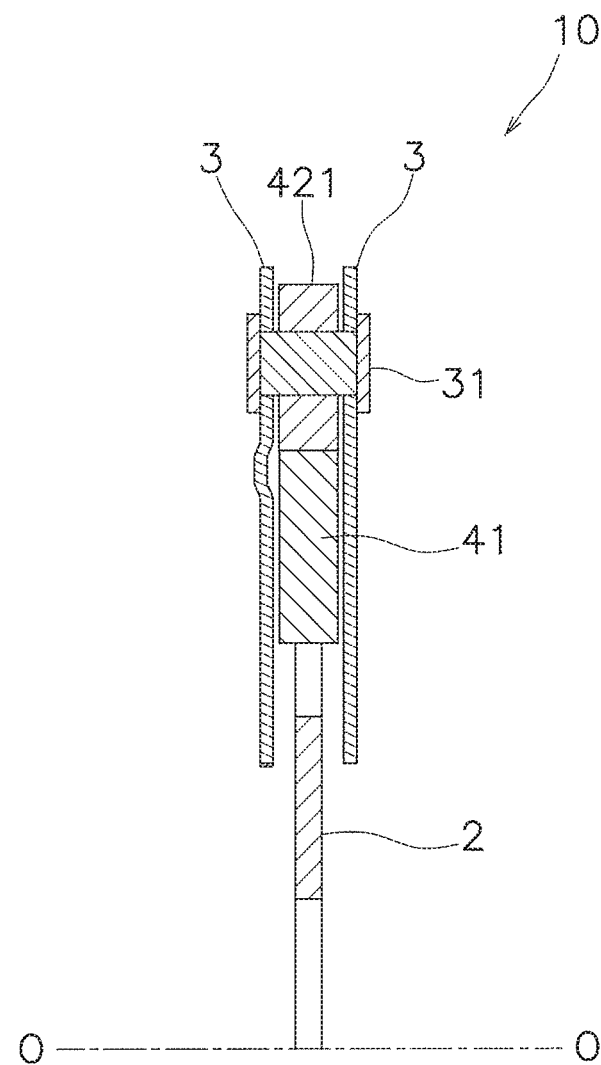
FIG. 3 is a cross-sectional view of FIG. 2 taken along line III-III.
Figure 4:
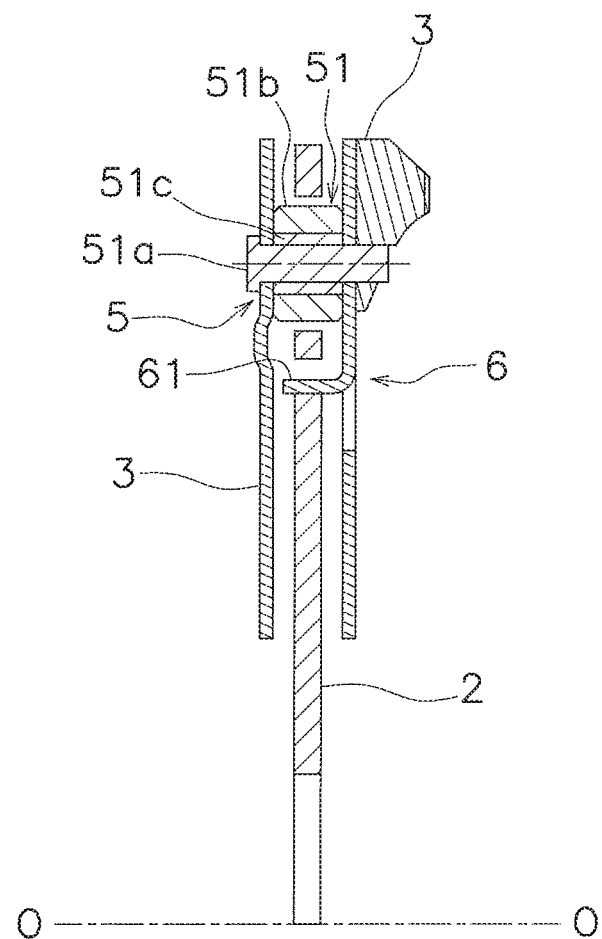
FIG. 4 is a cross-sectional view of FIG. 2 taken along line IV-IV.

FIG. 2 is a front view of the torque fluctuation inhibiting device 10. It should be noted that one of inertia rings (near-side inertia ring) is detached in FIG. 2. FIG. 3 is a cross-sectional view of FIG. 2 taken along line III-III, whereas FIG. 4 is a cross-sectional view of FIG. 2 taken along line IV-IV. The torque fluctuation inhibiting device 10 is shown in part in FIG. 2, but as a whole, is composed of a plurality of parts, each of which corresponds to the part shown in FIG. 2 and is disposed in each of a plurality of (e.g., four) positions located at equal angular intervals in the circumferential direction. The part disposed in one of the positions will be hereinafter explained.

As shown in FIGS. 2 to 4, the torque fluctuation inhibiting device 10 includes the hub flange 2 (exemplary first rotor), a pair of inertia rings 3 (exemplary second rotor), a variable stiffness mechanism 4, a first stopper mechanism 5 and a second stopper mechanism 6.

<Hub Flange 2>

The hub flange 2 is disposed to be rotatable. The hub flange 2 is disposed in axial opposition to the input-side rotor 131. The hub flange 2 is rotatable relative to the input-side rotor 131. The hub flange 2 is coupled to the output hub 14. In other words, the hub flange 2 is unitarily rotated with the output hub 14.

The hub flange 2 has an annular shape. The hub flange 2 is coupled at the inner peripheral part thereof to the output hub 14. The hub flange 2 is provided with a recessed portion 21 in the outer peripheral part thereof. The recessed portion 21 is opened radially outward. The recessed portion 21 is shaped to be opened radially outward and has a predetermined depth.

<Inertia Rings 3>

The pair of inertia rings 3 is rotatable with the hub flange 2, and is also rotatable relative to the hub flange 2. In other words, the pair of inertia rings 3 is elastically coupled to the hub flange 2. Each inertia ring 3 is an annular plate. Detailedly, each inertia ring 3 has a continuous annular shape. The pair of inertia rings 3 functions as a mass body of the torque fluctuation inhibiting device 10.

The pair of inertia rings 3 is disposed to interpose the hub flange 2 therebetween. The pair of inertia rings 3 is disposed axially on the both sides of the hub flange 2 such that a predetermined gap is produced between the hub flange 2 and each inertia ring 3. In other words, the hub flange 2 and the pair of inertia rings 3 are disposed in axial alignment. The pair of inertia rings 3 has a rotational axis common to the hub flange 2.

The pair of inertia rings 3 is fixed to each other by rivets 31. Therefore, the pair of inertia rings 3 is axially, radially and circumferentially immovable relative to each other.

<Variable Stiffness Mechanism 4>

The variable stiffness mechanism 4 is configured to change the torsional stiffness between the hub flange 2 and the pair of inertia rings 3 in accordance with the rotational speed of either the hub flange 2 or the pair of inertia rings 3. It should be noted that in the present preferred embodiment, the variable stiffness mechanism 4 is configured to change the torsional stiffness in accordance with the rotational speed of the hub flange 2. Detailedly, the variable stiffness mechanism 4 increases the torsional stiffness between the hub flange 2 and the pair of inertia rings 3 with increase in rotational speed of the hub flange 2.

The variable stiffness mechanism 4 includes a centrifugal element 41 and a cam mechanism 42. The centrifugal element 41 is attached to the hub flange 2. Detailedly, the centrifugal element 41 is disposed in the recessed portion 21 of the hub flange 2. The centrifugal element 41 is disposed in the recessed portion 21 so as to be movable in the radial direction. The centrifugal element 41 is movable in the radial direction by a centrifugal force acting thereon in rotation of the hub flange 2.

Detailedly, the centrifugal element 41 includes a plurality of guide rollers 411. When the centrifugal element 41 is moved in the radial direction, the guide rollers 411 are rolled on the inner wall surfaces of the recessed portion 21. Accordingly, the centrifugal element 41 can be smoothly moved in the radial direction.

The centrifugal element 41 includes a cam surface 412. The cam surface 412 is made in the shape of a circular arc recessed radially inward as seen in a front view (along the axial direction as shown in FIG. 2). It should be noted that the cam surface 412 is the outer peripheral surface of the centrifugal element 41. As described below, the cam surface 412 of the centrifugal element 41 functions as a cam of the cam mechanism 42.

When torsion (relative displacement in the circumferential direction) is produced between the hub flange 2 and the inertia rings 3 while a centrifugal force is acting on the centrifugal element 41, the cam mechanism 42 converts the centrifugal force into a circumferential force directed to reduce the torsion angle.

The cam mechanism 42 is composed of a cam follower 421 and the cam surface 412 of the centrifugal element 41. It should be noted that the cam surface 412 of the centrifugal element 41 functions as the cam of the cam mechanism 42.

The cam follower 421 is attached to a trunk of the rivet 31. In other words, the cam follower 421 is supported by the rivet 31. It should be noted that the cam follower 421 is preferably attached to the rivet 31 in a rotatable manner, but alternatively, can be attached thereto in a non-rotatable manner. The cam surface 412 is a surface with which the cam follower 421 makes contact, and is made in the shape of a circular arc as seen in the axial direction. The cam follower 421 is moved along the cam surface 412 when the hub flange 2 and the inertia rings 3 are rotated relative to each other within a predetermined angular range.

When the torsion angle (rotational phase difference) is produced between the hub flange 2 and the inertia rings 3 by the contact between the cam follower 421 and the cam surface 412, the centrifugal force generated in the centrifugal element 41 is converted into the circumferential force by which the torsion angle is reduced.

<First Stopper Mechanism>

As shown in FIGS. 2 and 4, the first stopper mechanism 5 is configured to restrict relative rotation between the hub flange 2 and the inertia rings 3. Detailedly, when the torsion angle between the hub flange 2 and the inertia rings 3 reaches a first angle $\theta 1$, the first stopper mechanism 5 restricts the relative rotation between the hub flange 2 and the inertia rings 3.

The first stopper mechanism 5 includes a stop pin 51 (exemplary first protruding member) and a first elongated hole 52. The stop pin 51 is fixed to the inertia rings 3. As shown in FIG. 4, the stop pin 51 includes a pin body 51a and an outer peripheral part 51b. It should be noted that the stop pin 51 can further include an intermediate member 51c.

The pin body 51a is fixed to the inertia rings 3. The pin body 51a extends between the pair of inertia rings 3, whereby the pair of inertia rings 3 is coupled to each other.

The outer peripheral part 51b has a cylindrical shape. The outer peripheral part 51b is attached to the pin body 51a while covering the outer peripheral surface of the pin body 51a. It should be noted that in the present preferred embodiment, the outer peripheral part 51b is attached to the pin body 51a through the intermediate member 51c. The outer peripheral part 51b is disposed axially between the pair of inertia rings 3. The outer peripheral part 51b is made of elastic material. Specifically, the outer peripheral part 51b is made of rubber.

As shown in FIG. 2, the first elongated hole 52 is provided in the hub flange 2. The first elongated hole 52 is disposed in the outer peripheral part of the hub flange 2. The first elongated hole 52 extends in the circumferential direction. The stop pin 51 axially penetrates the hub flange 2 through the first elongated hole 52. Inner wall surfaces, by which the first elongated hole 52 is defined, includes a pair of first inner wall surfaces 52a circumferentially facing each other. The pair of first inner wall surfaces 52a corresponds to a first contact surface of the present invention.

Each first inner wall surface 52a is circumferentially disposed at an interval from the stop pin 51. Each first inner wall surface 52a is circumferentially opposed to the stop pin 51. Each first inner wall surface 52a is made in the shape of a curved surface. Detailedly, each first inner wall surface 52a is shaped along the outer peripheral surface of the outer peripheral part 51b.

When the torsion angle between the hub flange 2 and the inertia rings 3 reaches the first angle $\theta 1$, the outer peripheral part 51b makes contact with one of the first inner wall surfaces 52a. Accordingly, the hub flange 2 and the inertia rings 3 can be inhibited from being displaced relative to each other at the first angle $\theta 1$ or greater. It should be noted that the outer peripheral part 51b of the stop pin 51 is made of rubber; when the outer peripheral part 51b is elastically deformed, the hub flange 2 and the inertia rings 3 can be displaced relative to each other at more than the first angle θ1.

<Second Stopper Mechanism>

As shown in FIGS. 2 and 4, the second stopper mechanism 6 is configured to restrict the relative rotation between the hub flange 2 and the inertia rings 3. Detailedly, the second stopper mechanism 6 restricts the relative rotation between the hub flange 2 and the inertia rings 3 when the torsion angle between the hub flange 2 and the inertia rings 3 reaches a second angle θ2. It should be noted that the second angle θ2 is greater than the first angle θ1. A difference between the second angle θ2 and the first angle θ1 is set such that the outer peripheral part 51b of the stop pin 51 is elastically deformed without being cracked or cut. For example, the second stopper mechanism 6 can be set to be actuated when the outer peripheral part 51b of the stop pin 51 is changed in thickness at a portion thereof making contact with the aforementioned one of the first inner wall surfaces 52a such that the thickness of the portion becomes roughly 60-70% of that in a normal situation. Specifically, the second angle θ2 can be set to be greater than the first angle θ1 by roughly 1-2 degrees, albeit not particularly limited to this angular setting.

The second stopper mechanism 6 is disposed on the inner side of the first stopper mechanism 5 in the radial direction. The second stopper mechanism 6 includes a pawl portion 61 (exemplary second protruding member) and a second elongated hole 62. The pawl portion 61 is fixed to one of the pair of inertia rings 3. Detailedly, the pawl portion 61 is integrated with the aforementioned one of the pair of inertia rings 3. In other words, the pawl portion 61 is formed by bending in part the aforementioned one of the pair of inertia rings 3 in the axial direction. The pawl portion 61 extends in the axial direction. The pawl portion 61 extends toward the hub flange 2.

The outer peripheral part of the pawl portion 61 has a higher stiffness than the outer peripheral part 51b of the stop pin 51. Specifically, the outer peripheral part of the pawl portion 61 is made of metal. It should be noted that the outer peripheral part of the pawl portion 61 is integrated with the inner peripheral part thereof, and thus, the pawl portion 61 is entirely made of metal.

As shown in FIG. 2, the second elongated hole 62 is provided in the hub flange 2. The second elongated hole 62 is disposed in the outer peripheral part of the hub flange 2. It should be noted that the second elongated hole 62 is disposed on the inner side of the first elongated hole 52 in the radial direction. The second elongated hole 62 extends in the circumferential direction. The pawl portion 61 axially penetrates the hub flange 2 through the second elongated hole 62. Inner wall surfaces, by which the second elongated hole 62 is defined, include a pair of second inner wall surfaces 62a circumferentially facing each other. The pair of second inner wall surfaces 62a corresponds to a second contact surface of the present invention.

Each second inner wall surface 62a is circumferentially disposed at an interval from the pawl portion 61. Each second inner wall surface 62a is circumferentially opposed to the pawl portion 61. When the torsion angle between the hub flange 2 and the inertia rings 3 reaches the second angle θ2, the pawl portion 61 makes contact with one of the second inner wall surfaces 62a. Accordingly, the hub flange 2 and the inertia rings 3 can be prevented from being displaced relative to each other at the second angle θ2 or greater.

[Actuation of Torque Fluctuation Inhibiting Device]

Actuation of the torque fluctuation inhibiting device 10 will be explained with FIGS. 2 and 5.

In the lock-up on state, a torque transmitted to the front cover 11 is transmitted to the hub flange 2 through the input-side rotor 131 and the damper 132.

When torque fluctuations do not exist in torque transmission, the hub flange 2 and the inertia rings 3 are rotated in the condition shown in FIG. 2. In this condition, the cam follower 421 in the cam mechanism 42 makes contact with the radial innermost position (circumferential middle position) of the cam surface 412. Additionally in this condition, the torsion angle between the hub flange 2 and the inertia rings 3 is substantially "0".

Figure 5:
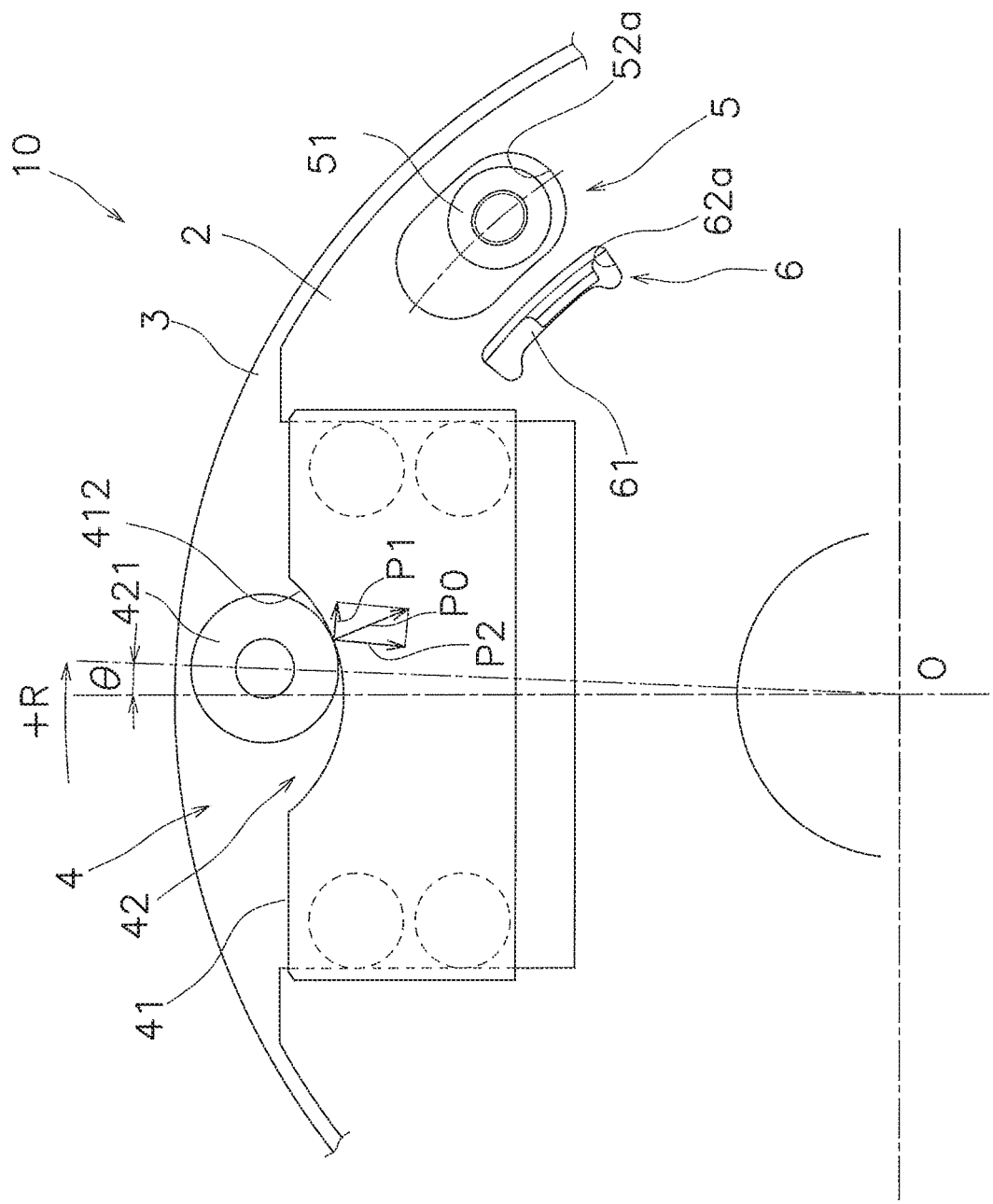
FIG. 5 is an enlarged view of the torque fluctuation inhibiting device in a displaced state (at a torsion angle θ).

It should be noted that in FIGS. 2 and 5, the torsion angle between the hub flange 2 and the inertia rings 3 indicates circumferential displacement between the circumferential middle position of the centrifugal element 41 and the cam surface 412 and the center position of the cam follower 421.

When torque fluctuations herein exist in torque transmission, a torsion angle θ is produced between the hub flange 2 and the inertia rings 3 as shown in FIG. 5. FIG. 5 shows a condition that a torsion angle +θ1 is produced to a +R side.

As shown in FIG. 5, when the torsion angle +θ is produced between the hub flange 2 and the inertia rings 3, the cam follower 421 in the cam mechanism 42 is relatively moved along the cam surface 412 to the right side in FIG. 5. At this time, a centrifugal force acts on the centrifugal element 41. Hence, a reaction force to be received by the cam surface 412 provided on the centrifugal element 41 from the cam follower 421 has a direction and a magnitude indicated by P0 in FIG. 5. A first force component P1 and a second force component P2 are produced by the reaction force P0. The first force component P1 is directed in the circumferential direction, whereas the second force component P2 is directed to move the centrifugal element 41 radially inward.

Additionally, the first force component P1 acts as a force to move the hub flange 2 rightward in FIG. 5 through the cam mechanism 42 and the centrifugal element 41. In other words, a force directed to reduce the torsion angle θ between the hub flange 2 and the inertia rings 3 is supposed to act on the hub flange 2. On the other hand, the second force component P2 moves the centrifugal element 41 to the inner peripheral side against the centrifugal force.

It should be noted that when the torsion angle is reversely produced, the cam follower 421 is relatively moved along the cam surface 412 to the left side in FIG. 5. However, the aforementioned actuation principle is also true of this case.

As described above, when the torsion angle is produced between the hub flange 2 and the inertia rings 3 by torque fluctuations, the hub flange 2 receives a force (first force component P1) directed to reduce the torsion angle between the both by the centrifugal force acting on the centrifugal element 41 and the working of the cam mechanism 42. Torque fluctuations are inhibited by this force.

The aforementioned force inhibiting torque fluctuations varies in accordance with the centrifugal force, in other words, the rotational speed of the hub flange 2, and also varies in accordance with the rotational phase difference and the shape of the cam surface 412. Therefore, by suitably setting the shape of the cam surface 412, characteristics of the torque fluctuation inhibiting device 10 can be made optimal in accordance with the specification of the engine and so forth.

For example, the cam surface 412 can be made in a shape that makes the first force component P1 linearly vary in accordance with the torsion angle in a condition where the centrifugal force acting is constant. Alternatively, the cam surface 412 can be made in a shape that makes the first force component P1 non-linearly vary in accordance with the rotational phase difference.

As described above, the force applied by the torque fluctuation inhibiting device 10 so as to inhibit torque fluctuations varies in accordance with the rotational speed of the hub flange 2. Specifically, when the drive source such as the engine is rotated at a high speed, the hub flange 2 is also rotated at a high speed. Hence, the centrifugal force acting on the centrifugal element 41 is large. Because of this, the torsional stiffness is also made large by the variable stiffness mechanism 4, whereby the torsion angle between the hub flange 2 and the inertia rings 3 becomes small. On the other hand, when the drive source such as the engine is rotated at a low speed, the hub flange 2 is also rotated at a low speed. Hence, the centrifugal force acting on the centrifugal element 41 is small. Because of this, the torsional stiffness is also made small by the variable stiffness mechanism 4, whereby the torsion angle between the hub flange 2 and the inertia rings 3 becomes large.

Figure 6:
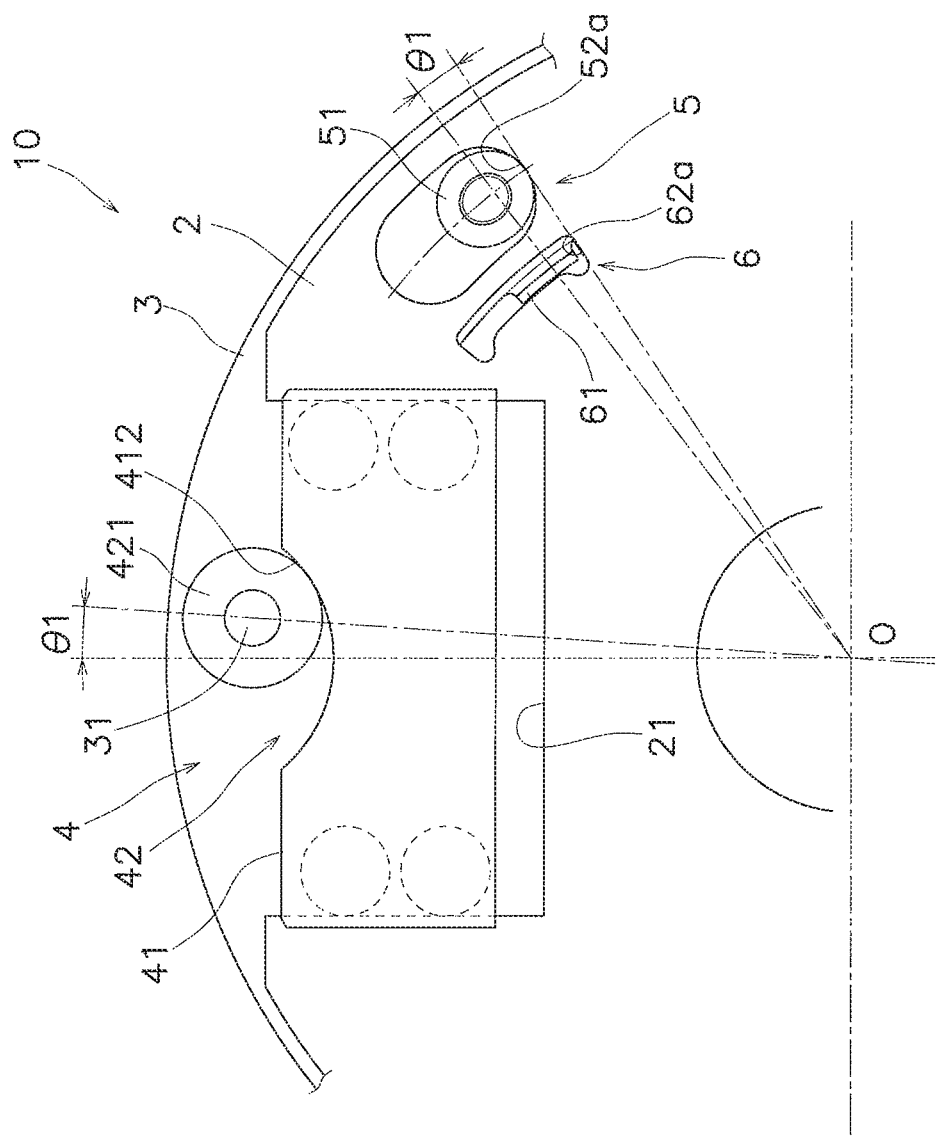
FIG. 6 is an enlarged view of the torque fluctuation inhibiting device in another displaced state (at a torsion angle θ1).

As shown in FIG. 6, when the torsion angle between the hub flange 2 and the inertia rings 3 reaches the first angle θ1, the first stopper mechanism 5 is actuated. In other words, the stop pin 51 makes contact with one of the first inner wall surfaces 52a. Accordingly, the hub flange 2 and the inertia rings 3 can be inhibited from being further displaced relative to each other at more than the first angle θ1. It should be noted that in this phase, the pawl portion 61 is not making contact with one of the second inner wall surfaces 62a, and hence, the second stopper mechanism 6 is not being actuated.

Figure 7:
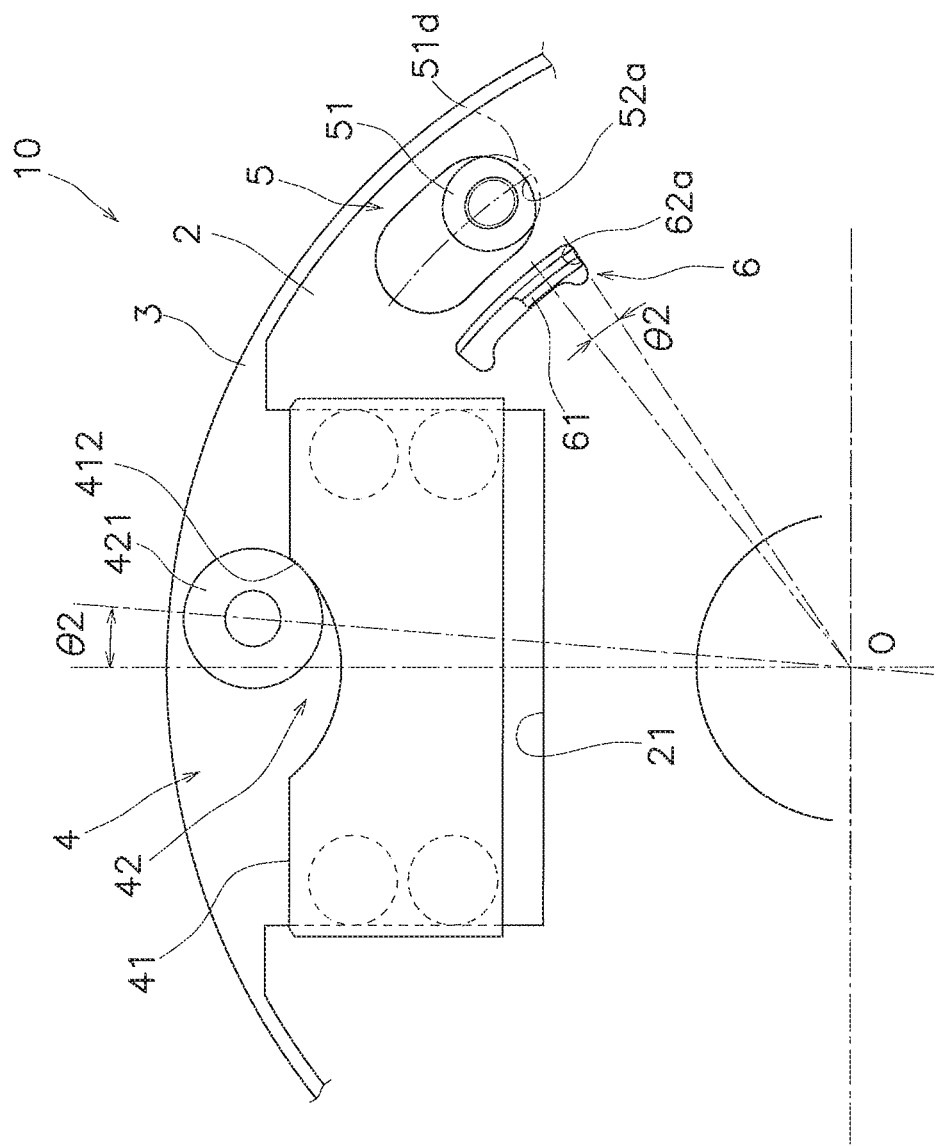
FIG. 7 is an enlarged view of the torque fluctuation inhibiting device in yet another displaced state (at a torsion angle θ2).

When the outer peripheral part 51b of the stop pin 51 is elastically deformed in the condition shown in FIG. 6, chances are that the hub flange 2 and the inertia rings 3 are further displaced relative to each other. For example, as shown in FIG. 7, when the torsion angle between the hub flange 2 and the inertia rings 3 reaches the second angle θ2, the second stopper mechanism 6 is actuated. In other words, the pawl portion 61 makes contact with the aforementioned one of the second inner wall surfaces 62a. It should be noted that in FIG. 7, a portion 51d of the stop pin 51, depicted with a dashed two-dotted line, corresponds to an elastically deformed portion.

The pawl portion 61 is made of metal. Hence, when the pawl portion 61 makes contact with the aforementioned one of the second contact surfaces 62a, the hub flange 2 and the inertia rings 3 can be prevented from being further displaced relative to each other at more than the second angle θ2. Because of this, the outer peripheral part 51b of the stop pin 51 can be inhibited from being further elastically deformed, whereby damage or breakage of the outer peripheral part 51b can be inhibited.

[Exemplary Characteristics]

Figure 8:
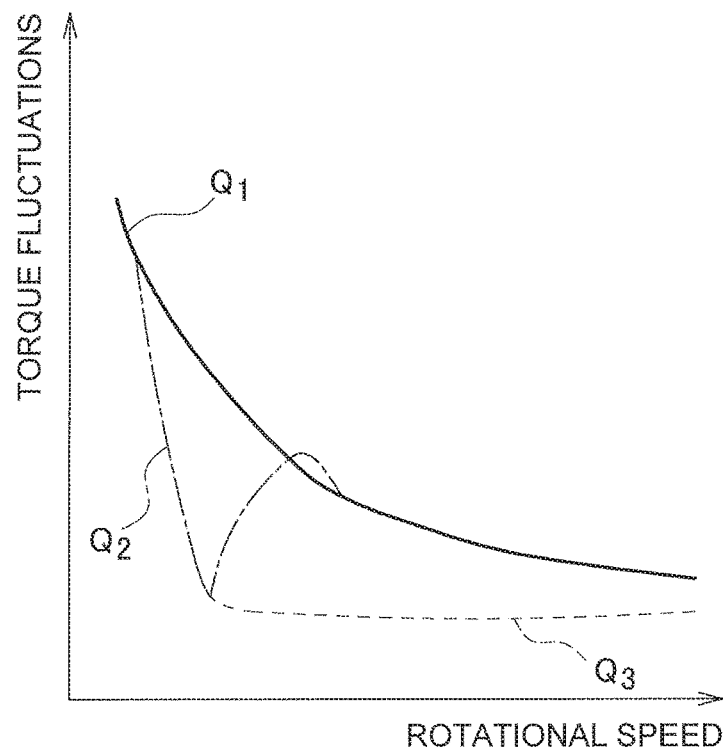
FIG. 8 is a chart showing a relation between rotational speed and torque fluctuations.

FIG. 8 is a diagram showing exemplary characteristics of the torque fluctuation inhibiting device 10. The horizontal axis indicates rotational speed, whereas the vertical axis indicates torque fluctuations (rotational speed fluctuations). Characteristic Q1 indicates a condition without installation of a device for inhibiting torque fluctuations; characteristic Q2 indicates a condition with installation of a well-known dynamic damper device without any cam mechanism; and characteristic Q3 indicates a condition with installation of the torque fluctuation inhibiting device 10 of the present preferred embodiment.

As is obvious from FIG. 8, in an apparatus in which the well-known dynamic damper device without any variable stiffness mechanism is installed (characteristic Q2), torque fluctuations can be inhibited only in a specific rotational speed range. By contrast, in the condition with installation of the torque fluctuation inhibiting device 10 with the variable stiffness mechanisms 4 of the present preferred embodiment (characteristic Q3), torque fluctuations can be inhibited through the entire rotational speed ranges.

[Modifications]

The present invention is not limited to the preferred embodiment described above, and a variety of changes or modifications can be made without departing from the scope of the present invention.

<Modification 1>

Figure 9:
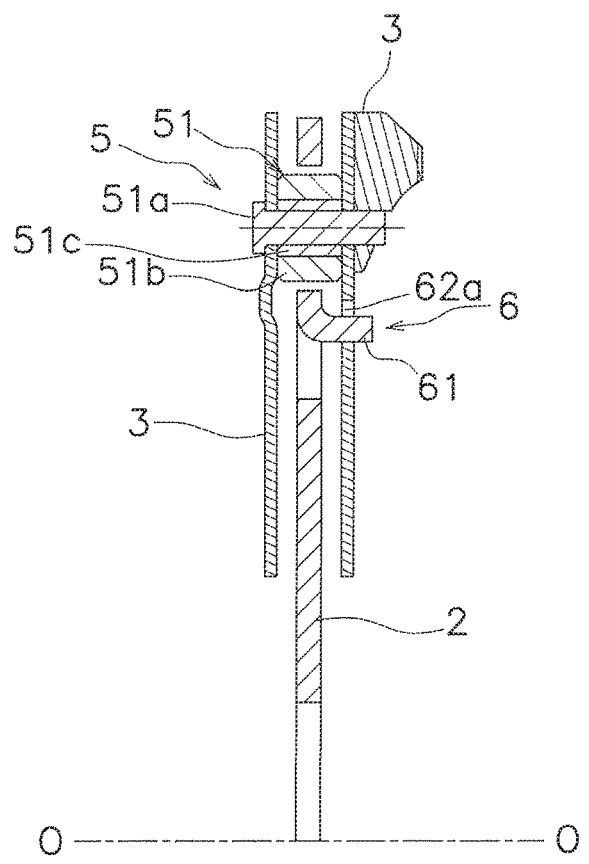
FIG. 9 is a diagram corresponding to FIG. 4 regarding a torque fluctuation inhibiting device according to a modification.

In the present preferred embodiment, the stop pins 51 and the pawl portions 61 are fixed to at least one of the pair of inertia rings 3, whereas the pairs of first inner wall surfaces 52a and the pairs of second inner wall surfaces 62a are provided in the hub flange 2. However, the configurations of the first and second stopper mechanisms 5 and 6 are not limited to the above. For example, as shown in FIG. 9, the pawl portions 61 can be fixed to the hub flange 2, whereas the pairs of second inner wall surfaces 62a can be provided in one of the pair of inertia rings 3.

<Modification 2>

In the aforementioned preferred embodiment, the pawl portions 61 are provided as the second protruding portions. However, similarly to constituent elements provided as the first protruding portions, stop pins can be provided as the second protruding portions. Furthermore or alternatively, each second protruding portion is made of metal, but may not be made of metal as long as the stiffness thereof is higher than that of each first protruding portion.

<Modification 3>

The centrifugal elements 41 can be attached not to the hub flange 2 but to the inertia rings 3. In this case, the cam followers 421 are attached to the hub flange 2.

<Modification 4>

In the aforementioned preferred embodiment, the hub flange 2 is exemplified as the first rotor. However, the first rotor is not limited to the above. For example, when a torque fluctuation inhibiting device is attached to a torque converter as configured in the present preferred embodiment, the front cover 11, the input-side rotor 131 or so forth can be set as the first rotor in the torque converter 100. Moreover, in the present preferred embodiment, the hub flange 2 is exemplified as the first rotor, while the pair of inertia rings 3 is exemplified as the second rotor. Alternatively, the pair of inertia rings 3 can be an example of the first rotor, while the hub flange 2 can be an example of the second rotor.

<Modification 5>

In the aforementioned preferred embodiment, the torque fluctuation inhibiting device 10 is attached to the torque converter 100. Alternatively, the torque fluctuation inhibiting device 10 can be attached to another type of power transmission device such as a clutch device.

<Modification 6>

Figure 10:
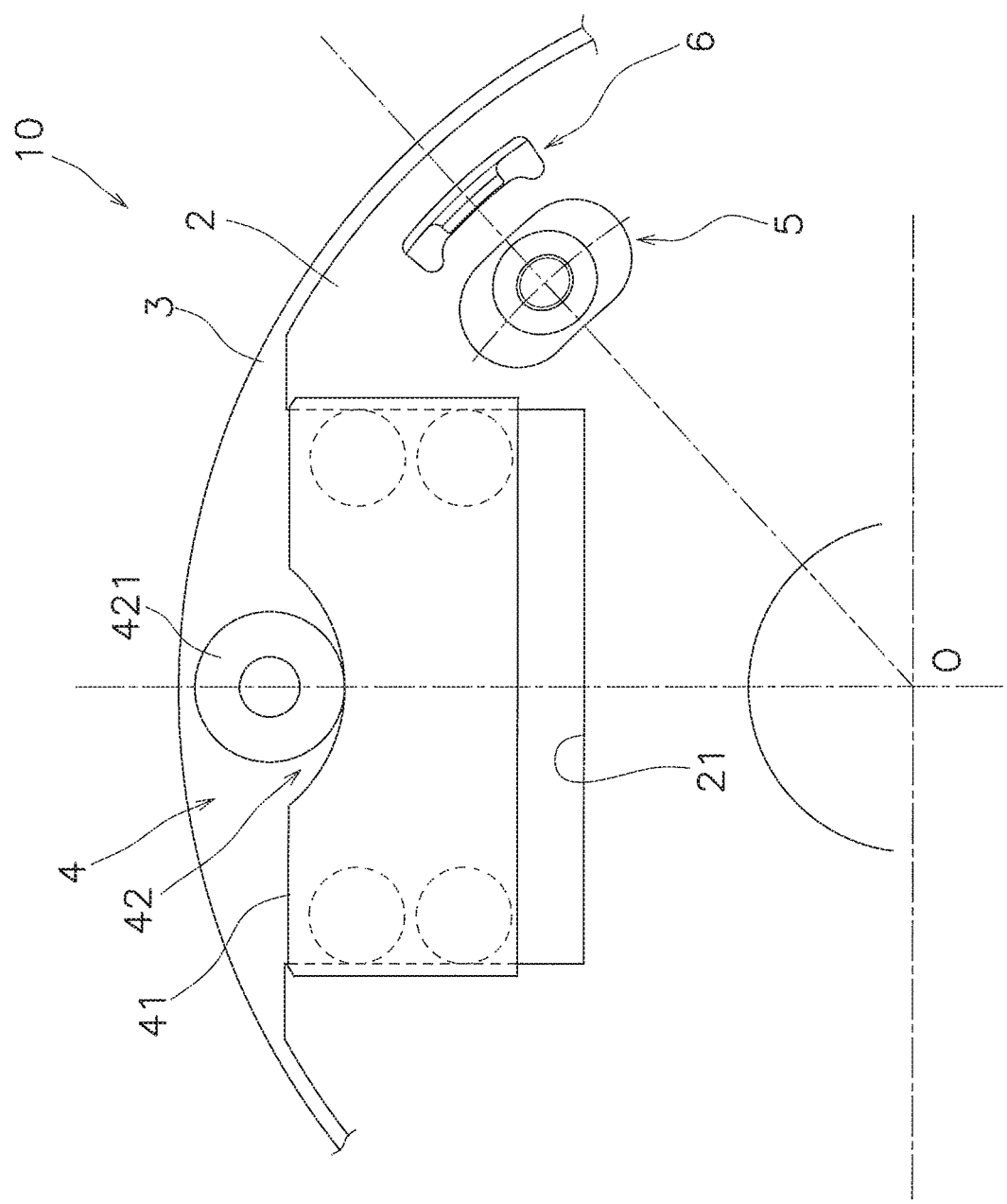
FIG. 10 is a diagram corresponding to FIG. 2 regarding a torque fluctuation inhibiting device according to another modification.
Figure 11:
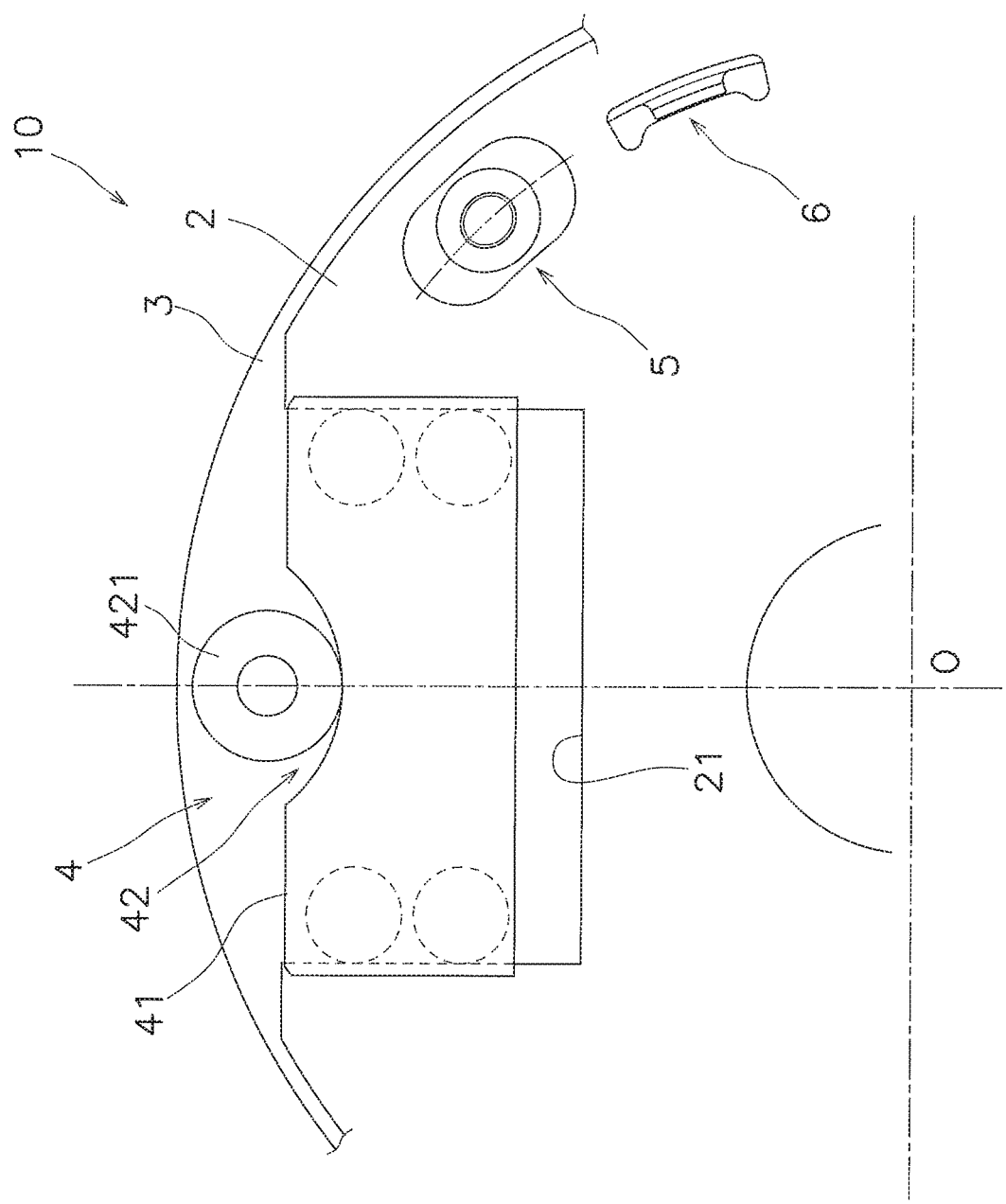
FIG. 11 is a diagram corresponding to FIG. 2 regarding a torque fluctuation inhibiting device according to an alternative of the another modification.

In the aforementioned preferred embodiment, the second stopper mechanism 6 is disposed on the inner side of the first stopper mechanism 5 in the radial direction. However, the positional relation therebetween is not limited to the above. For example, as shown in FIG. 10, the second stopper mechanism 6 can be disposed on the outer side of the first stopper mechanism 5 in the radial direction. Alternatively, as shown in FIG. 11, the second stopper mechanism 6 can be disposed at an interval from the first stopper mechanism 5 in the circumferential direction.

REFERENCE SIGNS LIST

2 Hub flange
3 Inertia ring
4 Variable stiffliess mechanism
41 Centrifugal element
42 Cam mechanism
5 First stopper mechanism
51 Stop pin
52a First inner wall surface
6 Second stopper mechanism
61 Pawl portion
62a Second inner wall surface

What is claimed is:

1. A rotary device comprising:
a first rotor disposed to be rotatable;
a second rotor disposed to be rotated with the first rotor and be rotatable relative to the first rotor;
a first stopper mechanism configured to restrict relative rotation between the first rotor and the second rotor, the first stopper mechanism including a first protruding member and a first contact surface, the first protruding member including an outer peripheral part made of an elastic material, the first contact surface disposed at an interval from the first protruding member in a circumferential direction until a torsion angle between the first rotor and the second rotor reaches a first angle, the first protruding member making contact with the first contact surface when the torsion angle reaches the first angle; and
a second stopper mechanism configured to restrict the relative rotation between the first rotor and the second rotor, the second stopper mechanism including a second protruding member and a second contact surface, the second protruding member including an outer peripheral part made of a material having a higher stiffness than the outer peripheral part of the first protruding member, the second contact surface disposed at an interval from the second protruding member in the circumferential direction until the torsion angle reaches a second angle greater than the first angle, the second protruding member making contact with the second contact surface when the torsion angle reaches the second angle.

2. The rotary device according to claim 1, wherein the outer peripheral part of the first protruding member is made of rubber.

3. The rotary device according to claim 1, wherein the outer peripheral part of the second protruding member is made of metal.

4. The rotary device according to claim 1, wherein
the first and second contact surfaces are provided in the first rotor, and
the first and second protruding members are fixed to the second rotor.

5. The rotary device according to claim 1, wherein
the first protruding member is fixed to the first rotor,
the first contact surface is provided in the second rotor,
the second protruding member is fixed to the second rotor, and
the second contact surface is provided in the first rotor.

6. The rotary device according to claim 1, wherein the second protruding member is a pawl portion formed by bending in part the first or second rotor in an axial direction.

7. The rotary device according to claim 1, wherein the second stopper mechanism is disposed on an inner side of the first stopper mechanism in a radial direction.

8. The rotary device according to claim 1, wherein the second stopper mechanism is disposed on an outer side of the first stopper mechanism in a radial direction.

9. The rotary device according to claim 1, wherein the second stopper mechanism is disposed at an interval from the first stopper mechanism in the circumferential direction.

10. The rotary device according to claim 1, further comprising:
a variable stiffness mechanism configured to change a torsional stiffness between the first rotor and the second rotor in accordance with a rotational speed of the first or second rotor.

11. The rotary device according to claim 10, wherein the variable stiffness mechanism includes:
a centrifugal element radially movable by a centrifugal force acting thereon in rotation of the first or second rotor, and
a cam mechanism configured to receive the centrifugal force acting on the centrifugal element, the cam mechanism further configured to convert the centrifugal force into a circumferential force directed to reduce the torsion angle between the first rotor and the second rotor.

* * * * *